(12) United States Patent
Hashimoto (10) Patent No.: US 9,181,090 B2
(45) Date of Patent: Nov. 10, 2015

(54) CARBON NANOTUBE DISPERSION AND UTILIZATION OF SAME

(75) Inventor: Takeshi Hashimoto, Nagoya (JP)

(73) Assignee: MEIJO NANO CARBON CO., LTD., Nagoya-Shi (JP)

( * ) Notice: Subject to any disclaimer, the term of this patent is extended or adjusted under 35 U.S.C. 154(b) by 435 days.

(21) Appl. No.: 12/866,548

(22) PCT Filed: Feb. 8, 2008

(86) PCT No.: PCT/JP2008/052153
§ 371 (c)(1),
(2), (4) Date: Aug. 6, 2010

(87) PCT Pub. No.: WO2009/098779
PCT Pub. Date: Aug. 13, 2009

(65) Prior Publication Data
US 2010/0330358 A1    Dec. 30, 2010

(51) Int. Cl.
*C08K 5/05* (2006.01)
*B82Y 30/00* (2011.01)
*B82Y 40/00* (2011.01)
*C01B 31/02* (2006.01)

(52) U.S. Cl.
CPC ............ *B82Y 30/00* (2013.01); *B82Y 40/00* (2013.01); *C01B 31/0273* (2013.01); *C01B 2202/34* (2013.01); *C01B 2202/36* (2013.01); *Y10T 428/25* (2015.01)

(58) Field of Classification Search
CPC .... B82Y 30/00; B82Y 40/00; C01B 31/0273; C01B 2202/34; C01B 2202/35; Y10T 428/25
USPC ................................. 524/379, 557
See application file for complete search history.

(56) References Cited

U.S. PATENT DOCUMENTS

| 6,346,023 | B1 | 2/2002 | Tsuboi et al. | |
|---|---|---|---|---|
| 7,850,874 | B2 * | 12/2010 | Lu et al. ............... | 252/510 |
| 2006/0014275 | A1 | 1/2006 | Yanagisawa et al. | |
| 2006/0052509 | A1 | 3/2006 | Saitoh | |
| 2007/0067881 | A1 | 3/2007 | Lin et al. | |
| 2009/0321688 | A1 | 12/2009 | Saitoh | |
| 2010/0068500 | A1 * | 3/2010 | Nelson et al. ............ | 428/323 |
| 2010/0273263 | A1 | 10/2010 | Hashimoto et al. | |

FOREIGN PATENT DOCUMENTS

| EP | 1 878 763 | A2 | 1/2008 | |
|---|---|---|---|---|
| JP | 2000-86219 | | 3/2000 | |
| JP | 2004-75705 | A | 3/2004 | |
| JP | 2004075705 | A * | 3/2004 | ......... C09D 201/00 |
| JP | 2005-75661 | A | 3/2005 | |
| JP | 2005-89738 | A | 4/2005 | |
| JP | 2005-97499 | A | 4/2005 | |
| JP | 2005-130759 | | 5/2005 | |
| JP | 2005-324999 | A | 11/2005 | |
| JP | 2006-16450 | A | 1/2006 | |
| JP | 2006-223273 | | 8/2006 | |
| JP | 2007-39623 | | 2/2007 | |
| JP | 2008-1898 | A | 1/2008 | |
| WO | 2009/078333 | | 6/2009 | |

OTHER PUBLICATIONS

International Search Report from parent International Application No. PCT/JP2008/052153.
U.S. Appl. No. 12/747,826, Inventors: Hashimoto et al., filed Jun. 11, 2010 (to be published Oct. 28, 2010).
Written Opinion from parent PCT application No. PCT/JP2008/052153 with English translation of prior art rejections based upon originally-filed PCT claims.
International Preliminary Report on Patentability from parent PCT application No. PCT/JP2008/052153 (prepared based upon amended claims filed according to Art. 34 PCT).
Aoki, N. et al., Carbon nanotubes as scaffolds for cell culture and effect on cellular functions, Dental Materials Journal, Mar. 2007, vol. 26, No. 2, p. 178-185.
Bajaj, P. et al., Control of spatial cell attachment on carbon nanofiber patterns on polycarbonate urethane, International Journal of Nanomedicine, 2006, vol. 1, No. 3, p. 361-365.
Hilding et al., Dispersion of Carbon Nanotubes in Liquids, Journal of Dispersion Science and Technology, vol. 24, No. 1, pp. 1-41 (2003).

\* cited by examiner

*Primary Examiner* — David W Wu
*Assistant Examiner* — Marie Reddick
(74) *Attorney, Agent, or Firm* — J-Tek Law PLLC; Jeffrey D. Tekanic; Scott T. Wakeman (57) ABSTRACT

The present invention provides a carbon nanotube dispersion, in which carbon nanotubes are uniformly dispersed and a satisfactory dispersed state is maintained over a long period of time, and also inherent properties of carbon nanotubes can be exhibited. The carbon nanotube dispersion contains an alcohol solvent (preferably a lower alcohol having about 1 to 4 carbon atoms) and a polyvinyl acetal resin.

20 Claims, 4 Drawing Sheets

CARBON NANOTUBE DISPERSION AND UTILIZATION OF SAME

CROSS-REFERENCE

This application is the U.S. national stage of International Application No. PCT/JP2008/052153 filed Feb. 8, 2008.

TECHNICAL FIELD

The present invention relates to a carbon nanotube dispersion in which carbon nanotubes are dispersed in a prescribed liquid medium. In addition, the present invention relates to a manufacturing method of the dispersion. Moreover, the present invention relates to a carbon nanotube film obtained by applying the carbon nanotube dispersion onto a substrate.

BACKGROUND ART

Carbon nanotubes are a new material that is attracting attention from numerous fields as a result of having superior electrical conductivity, thermal conductivity, mechanical strength and the like. Various studies have been conducted not only on the use of these carbon nanotubes alone, but also on their use as composite materials, in which they are dispersed in other materials. For example, a carbon nanotube dispersion, in which carbon nanotubes are dispersed in a dispersion medium, can be used as an electrical conductivity-imparting agent or an anti-static agent. In addition, the carbon nanotube dispersion can be coated on a substrate such as a film or a sheet to form an electrically-conductive layer, and this substrate can be used in an emitter material of a display, a fuel cell electrode material, a gas storage material or the like.

In general, carbon nanotubes are produced and sold in a state in which a large number of tubes are aggregated together. Carbon nanotubes in this aggregated state have the problem of being difficult to uniformly disperse in other materials (liquid media). In order to solve this problem, various methods have been investigated to improve the dispersibility of carbon nanotubes. For example, Patent Document 1 describes a method for crushing a mixture of a prescribed liquid and carbon nanotubes using a wet-medium stirring mill, and dispersing the carbon nanotubes in the liquid. Patent Document 2 describes a method for dispersing carbon nanotubes in a mixture of an amide-based polar organic solvent and a nonionic surfactant. Patent Document 3 describes a method for improving dispersibility of carbon nanotubes by attaching a conjugated polymer to a portion of the carbon nanotubes.

Patent Document 1: Japanese Patent Application Laid-Open No. 2005-324999
Patent Document 2: Japanese Patent Application Laid-Open No. 2005-075661
Patent Document 3: Japanese Patent Application Laid-Open No. 2005-089738

However, in the method described in Patent Document 1, the carbon nanotubes are susceptible to excessive fragmentation and damage to the tube wall structures. Carbon tubes that have been shortened due to excessive fragmentation or which have undergone considerable damage are unable to properly and adequately exhibit the inherent properties of carbon nanotubes (such as electrical conductivity or strength). In addition, in the methods described in Patent Documents 2 and 3, numerous types of materials (ingredients), such as surfactants or conjugated polymers, are mixed, resulting in an increase in the number of steps, such as a step for mixing these mixture materials and a step for removing unreacted substances (purification step), thereby resulting in the risk of increased complexity of the production process. In addition, the production cost of the carbon nanotube dispersion increases due to the use of such special mixture materials.

Therefore, there is a long-felt need to provide a carbon nanotube dispersion, in which the carbon materials are uniformly dispersed and a satisfactory dispersed state is maintained over a long period of time, and also inherent properties of the carbon nanotubes can be exhibited. In addition, there is a long-felt need to provide a method for producing such a carbon nanotube dispersion. Moreover, there is also a long-felt need to provide a carbon nanotube film (namely, a film having carbon nanotubes as the main constituent) obtained by applying such a carbon nanotube dispersion onto a substrate, and a film element provided with the carbon nanotube film.

DISCLOSURE OF THE INVENTION

A carbon nanotube dispersion is provided by the present teachings. This dispersion comprises carbon nanotubes dispersed in a liquid medium, and the liquid medium contains an alcohol solvent and a polyvinyl acetal resin.

It has been difficult in the past to disperse carbon nanotubes in an organic solvent such as alcohol. Consequently, carbon nanotubes have been dispersed in the above-mentioned solvents (dispersion media) by adding large amounts of numerous types of dispersants. The inventor of the present invention found that the dispersibility of carbon nanotubes can be improved considerably, and a satisfactorily and uniformly dispersed state of the carbon nanotubes is maintained for a long period of time, by adding at least a polyvinyl acetal resin to an alcohol solvent. Namely, this carbon nanotube dispersion contains an alcohol solvent and a polyvinyl acetal resin in a liquid medium. Consequently, this dispersion enables carbon nanotubes to be uniformly dispersed and this dispersion is able to maintain that satisfactorily dispersed state over a long period of time. In addition, in the dispersion disclosed herein, the number of essential constituents can be reduced. Consequently, there are fewer restrictions on usage conditions and the composition has a higher degree of freedom. Namely, components that are able to impart desired functions to the dispersion can be added in accordance with the intended use, thereby facilitating the preparation of a desired composition. Thus, this dispersion can be used as a raw material (for example, a functional material) in a wide range of fields.

In a preferred aspect of the dispersion disclosed herein, the alcohol solvent is a lower alcohol (such as an alcohol having 8 or fewer carbon atoms), in particular a lower alcohol having 1 to 4 carbon atoms.

In this aspect, the following effects are demonstrated as a result of using a lower alcohol having 1 to 4 carbon atoms as the alcohol solvent. First, lower alcohols having 1 to 4 carbon atoms are highly volatile. Consequently, when the dispersion is coated to produce a carbon nanotube film, the alcohol is easily removed from the coating. In addition, since such lower alcohols are readily available and place a comparatively low burden on the environment as compared with organic solvents such as xylene, they have a high degree of universality as solvents. Carbon nanotube dispersions obtained by using such alcohols can be utilized in a wider range of fields.

In a preferred aspect of the dispersion disclosed herein, 0.5 mg to 1000 mg (for example, 1 mg to 10 mg and typically 1 mg to 5 mg) of the carbon nanotubes are dispersed per 100 mL of the alcohol solvent.

In addition, the polyvinyl acetal resin is preferably contained at a weight ratio of 0.5 to 10 (more preferably 1 to 5 and typically 1 to 3) with respect to the carbon nanotubes.

According to this aspect, the effect of improving the dispersibility of the carbon nanotubes in the liquid medium is further enhanced, thereby enabling a stable dispersion to be maintained over a longer period of time.

The polyvinyl acetal resin used in the dispersion disclosed herein preferably has an average molecular weight of $1.0 \times 10^4$ to $2.5 \times 10^4$. In addition, a preferred example of the polyvinyl acetal resin is a polyvinyl butyral resin.

The polyvinyl butyral resin preferably has an average molecular weight of $1.0 \times 10^4$ to $2.5 \times 10^4$. In addition, this resin preferably has a degree of butyralation of 65 mol % to 85 mol %. Moreover, the solution viscosity of the polyvinyl butyral resin, when dissolved at a concentration of 10% by weight in a mixed solvent of ethanol and toluene that are mixed at a volume ratio of 1:1 at a temperature of 20° C., is preferably 5 mPa·s to 30 mPa·s.

Polyvinyl butyral resin typically dissolves easily in the above-mentioned alcohol solvent, resulting in a colorless and clear solution. In addition, a coated film using this solution has both toughness and flexibility, while also possessing satisfactory adhesive properties for various substrates. In addition to these general properties, the above-mentioned polyvinyl butyral resin also has a low molecular weight and low viscosity. Consequently, a carbon nanotube dispersion obtained by using such a resin has high wettability for substrates and can be easily and thinly coated onto a substrate over a wide area. In addition, if a carbon nanotube film is formed by applying (coating) this dispersion onto a substrate, the film adheres to the substrate with a satisfactory adhesion strength, and is able to become a transparent thin film having satisfactory electrical conductivity (or semiconductivity). Thus, a dispersion that uses this resin can preferably be utilized as a satisfactory film material.

In addition, according to certain embodiments disclosed herein, the carbon nanotubes maintain a dispersed state for at least two weeks if allowed to stand undisturbed at room temperature.

This dispersion is able to maintain a satisfactory dispersed state for a long period of time (at least two weeks) without aggregation and precipitation of the carbon nanotubes, even if allowed to stand undisturbed at room temperature and without requiring any stirring or other manipulation whatsoever. Elimination of the need to repeat dispersion procedures, such as stirring immediately before using the dispersion, prevents any decrease in work efficiency. Consequently, the dispersion can be handled easily and is preferably utilized as a raw material.

In addition, a method for producing a dispersion comprising carbon nanotubes dispersed in a liquid medium is also provided by the present teachings. This production method preferably includes: preparing carbon nanotubes; preparing a liquid medium containing an alcohol solvent and a polyvinyl acetal resin; and placing the carbon nanotubes in a container along with the medium and carrying out a dispersion treatment on the contents of the container. Here, the dispersion treatment preferably includes at least a stirring treatment and an ultrasonic treatment.

In addition, the dispersion treatment is preferably carried out so that a dispersion is formed in which carbon nanotube bundles (in other words, bundles of carbon nanotubes) having a length of 1 μm or more and diameter of less than 0.1 μm are dispersed in the above-mentioned medium.

According to this manufacturing method, a dispersion is obtained in which carbon nanotubes are uniformly dispersed in the liquid medium. In addition, as a result of carrying out the dispersion treatment that includes stirring and ultrasonic treatment, excessive fragmentation and damage to the carbon nanotubes are suppressed. Thus, according to this manufacturing method, a dispersion can be produced in which carbon nanotubes are uniformly dispersed in a liquid medium while in a state that enables the inherent properties of carbon nanotubes to be exhibited.

In another aspect of the present teachings, a carbon nanotube film is provided by applying any of the carbon nanotube dispersions disclosed herein onto a substrate. Alternatively, a carbon nanotube film is provided by applying onto a substrate a carbon nanotube dispersion produced according to any of the manufacturing methods disclosed herein. This carbon nanotube film is a film in which carbon nanotubes are uniformly dispersed, and is a film that exhibits satisfactory electrical conductivity (or semiconductivity) while also being provided with toughness and flexibility. In addition, if, for example, a transparent PET film or glass is used as the above-mentioned substrate, the carbon nanotube film formed on the substrate adheres to the substrate with strong adhesive strength, resulting in a transparent film that is resistant to separation. Moreover, if a component that imparts a desired function is added to the above-mentioned dispersion, a film obtained by using this dispersion can be a functional film. A film element, in which such a film is provided on a substrate, can be used in various industrial fields.

BEST MODE FOR CARRYING OUT THE INVENTION

The following provides an explanation of preferred embodiments of the present invention. With the exception of subject matter specifically mentioned in the present description, any subject matter required for carrying out the present invention (such as a method for synthesizing carbon nanotubes or a method for recovering carbon nanotubes) should be understood to be design matters carried out by a person with ordinary skill in the art based on conventional technology in the art. The present invention can be carried out based on the disclosure in the present description and common general technical knowledge in the art.

The carbon nanotube dispersion disclosed herein comprises carbon nanotubes uniformly dispersed in a liquid medium. This liquid medium contains an alcohol solvent and at least a polyvinyl acetal resin. In addition, a highly viscous ink-like composition, in which carbon nanotubes are contained at a high concentration, or a paste-like composition, are additional aspects of the present teachings that are included in the carbon nanotube dispersion disclosed herein, provided the carbon nanotubes are uniformly dispersed in a liquid medium.

There are no particular limitations on the type of carbon nanotubes used as raw materials for producing this carbon nanotube dispersion (namely, the carbon nanotubes to be dispersed), and carbon nanotubes produced according to various methods such as arc discharge, laser evaporation or chemical vapor deposition (CVD) can be suitably selected and used. Single-walled carbon nanotubes, multi-walled carbon nanotubes or mixtures thereof can be used in arbitrary ratios. Typically, carbon nanotube aggregates, in which a large number of carbon nanotubes have aggregated (and including the above-mentioned carbon nanotube bundles), are preferably used as the raw materials. In addition to the carbon nanotubes, the aggregates may also contain a carbon component, which does not form tubes (carbon impurity) such as amorphous carbon, a metal catalyst, etc. Products obtained according to the above-described various methods (for example, arc discharge) may be used as is for such carbon nanotube aggregates (raw materials), or may be used after subjecting the products to optional post-treatment (for example, purification treatment such as removal of amorphous carbon or removal of metal catalyst).

Although there are no particular limitations on the length of the carbon nanotubes that comprise the above-mentioned raw material, the length is typically at least about 1 μm or more and preferably 5 μm or more (typically 5 μm to 100 μm and preferably 5 μm to several tens of gm). This length may also be about 10 μm or more (typically 10 μm to 100 μm and preferably 10 μm to several tens of gm). According to a representative manufacturing method, a carbon nanotube dispersion can be obtained, in which inherent properties of the carbon nanotubes are readily exhibited, by suitably dispersing (preferably in a state in which a length of 1 μm or more is maintained) carbon nanotubes having the above-mentioned lengths by carrying out dispersion treatment that includes a stirring treatment and an ultrasonic treatment.

The liquid medium contained in the carbon nanotube dispersion disclosed herein contains an alcohol solvent and a polyvinyl acetal resin, and the alcohol solvent is preferably the main component of the liquid medium. In addition, one type or two or more types of alcohols selected from ordinary alcohols that are in the liquid state in the range of room temperatures (for example, 23° C. to 25° C.) can be used as the alcohol solvent. The type and composition of the alcohol solvent can be suitably selected in accordance with the objectives, the situation, etc. Examples of alcohol solvents that are preferable for carrying out the present invention typically include lower alcohols having about 1 to 4 carbon atoms. More preferably, these are lower alcohols capable of dissolving a polyvinyl acetal resin to be described later. Examples of such lower alcohols include lower alcohols having 1 to 4 carbon atoms such as methanol, ethanol, 1-propanol, 2-propanol (isopropyl alcohol), 1-butanol (n-butanol), 2-methyl-1-propanol (isobutanol), 2-butanol (sec-butanol) and 2-methyl-2-propanol (tert-butanol). As for the above-mentioned alcohol solvent, one type of these lower alcohols alone (such as ethanol or 2-methyl-1-propanol) or a mixed alcohol of two or more types of these lower alcohols (such as a mixture of ethanol and 1-butanol) mixed at a suitable mixing ratio, can be preferably used.

The lower alcohols described above are highly volatile. Consequently, if a dispersion in which carbon nanotubes are dispersed in a liquid medium containing these alcohols is spread, the alcohol volatilizes easily, thereby facilitating removal (drying) of the alcohol from the above-mentioned coating. In addition, these alcohols are readily-available, extremely common solvents. Consequently, dispersions that use these alcohols can be applied in a wide range of fields.

A polyvinyl acetal resin is contained in the liquid medium of the carbon nanotube dispersion disclosed herein. Polyvinyl acetal resins are generally obtained by saponifying a polyvinyl ester-based resin produced by polymerizing a vinyl ester-based monomer, and acetalating the resulting polyvinyl alcohol (PVA)-based resin (or denatured PVA-based resin) by reacting with an aldehyde. Consequently, this polyvinyl acetal resin is a polymer compound having structural units in which successive vinyl alcohol structural units of PVA-based resin are acetalated with an aldehyde compound (namely, structural units containing acetal groups), unreacted vinyl alcohol structural units (namely, structural units containing hydroxyl groups), and vinyl acetate structural units that are unsaponified portions of the PVA-based resin (namely, structural units containing acetyl groups). Physical or chemical properties vary and thermal properties, mechanical properties, solution viscosity and the like of the resin are influenced by the ratio of each structural unit (namely, the composition thereof) and the degree of polymerization (molecular weight). For example, a polyvinyl acetal resin composed of a large number of unreacted vinyl alcohol structural units (hydroxyl groups) is easily crystallized by hydrogen bonding, and has a high elastic modulus, toughness and hydrophilicity and exhibits superior adhesion with a substrate. In addition, a composition having a large number of acetal groups (having a high degree of acetalation) has superior flexibility and lipophilicity. In case the molecular weight (degree of polymerization) is high, the solution viscosity of the resin decreases.

Here, the polyvinyl acetal resin used in the liquid medium is preferably highly soluble in alcohol solvent, and preferably has the property of having a low solution viscosity even if the solution is prepared by dissolving the polyvinyl acetal resin in an alcohol solvent at a high concentration. Thus, a polyvinyl acetal resin preferable for carrying out the present invention can be employed by suitably selecting the molecular weight (degree of polymerization) and composition so as to exhibit the desired properties.

Although there are no particular limitations on the above-mentioned polyvinyl acetal resin, provided it exhibits the properties described above, polyvinyl butyral resin is one example of a polyvinyl acetal resin that can be preferably used. This is obtained by acetalating (butyralating) a PVA-based resin with butyl aldehyde.

The average molecular weight of a polyvinyl butyral resin having the above-mentioned properties, which is preferable for the present invention, is preferably $1.0 \times 10^4$ to $3.5 \times 10^4$, and more preferably $1.5 \times 10^4$ to $2.3 \times 10^4$. The degree of polymerization of a polyvinyl butyral resin having an average molecular weight as described above is preferably 150 to 600 and more preferably 200 to 350. This degree of polymerization can be adjusted by controlling the degree of polymerization of a polyvinyl ester-based resin (polymer) obtained by polymerizing a raw material vinyl ester-based monomer.

In addition, the polyvinyl butyral resin used is preferably a polyvinyl butyral resin in which the solution viscosity thereof at a temperature of 20° C., when dissolved at a concentration of 10% by weight in a mixed solvent consisting of ethanol and toluene at a volume ratio of 1:1, is 5 mPa·s to 30 mPa·s (preferably 9 mPa·s to 30 mPa·s and more preferably 9 mPa·s to 15 mPa·s or 10 mPa·s to 30 mPa·s). There are no particular limitations on the method used to measure the viscosity of the polyvinyl butyral resin, and a conventionally known method, such as the use of a BM-type rotational viscometer, can be preferably used.

In addition, the degree of butyralation of a polyvinyl butyral resin preferable for carrying out the present invention is preferably 65 mol % to 80 mol % (and more preferably 68 mol % to 77 mol %). In contrast, the preferred amount of hydroxyl groups of the resin is 20 mol % to 35 mol % (and preferably 21 mol % to 28 mol %). Moreover, the amount of acetyl groups remaining in the resin is 5 mol % or less (and preferably 2 mol % to 5 mol % or less). The degree of butyralation is the ratio of butyralated hydroxyl groups relative to the hydroxyl groups of the PVA or denatured PVA. Thus, if the above-mentioned degree of butyralation exceeds the above-mentioned range, although the solubility in organic solvent increases, the quantity of hydroxyl groups decreases. Consequently, the adhesion of a coated film of an alcohol solution of the resin decreases. On the other hand, if the degree of butyralation is below the lower limit of the above-mentioned range and the quantity of hydroxyl groups increases, the solubility in organic solvent decreases. Thus, the degree of butyralation and the remaining quantity of hydroxyl groups is preferably balanced within the above-mentioned ranges in the polyvinyl butyral resin.

A conventionally known method can be preferably used to calculate the degree of butyralation, and there are no particular limitations thereon. For example, since butyral groups of the polyvinyl butyral resin are formed by acetalation of two hydroxyl groups, the number of the two hydroxyl groups that are acetalated is counted, followed by calculating the molar percentage (mol %) thereof. In addition, an example of a method for determining the quantity of hydroxyl groups of the polyvinyl butyral resin consists of preparing a solution of dimethylsulfoxide or the like and using as a resonance species, followed by measuring the nuclear magnetic resonance spectrum using the isotope $^{13}C$ (typically, $^{13}C$-NMR), or quantifying the quantity of hydroxyl groups by measuring the infrared spectrum (IR). Alternatively, the above-mentioned degree of butyralation and the quantity of hydroxyl groups can be preferably determined by measuring in accordance with JIS K6728 ("Testing method for polyvinyl butyral)".

A low polymerization degree type of polyvinyl butyral resin that is a member of the "S-LEC B" series of products manufactured by Sekisui Chemical Co., Ltd. can be used as a commercial product that is preferable for the present invention. Particularly preferable examples of the same type of products include "BL-10" (calculated molecular weight: approx. $1.5 \times 10^4$, hydroxyl groups: approx. 28 mol %, degree of butyralation: 71±3 mol %, solution viscosity as defined above: 9 to 15 mPa·s) and "BL-S" (calculated molecular weight: approx. $3.2 \times 10^4$, hydroxyl groups: approx. 21 mol %, degree of butyralation: 77 mol % or more, solution viscosity as defined above: 10 to 30 mPa·s).

When preparing the polyvinyl butyral resin, a commercially-available product as described above may be acquired or may be produced to have a prescribed molecular weight and composition. In the case of producing a polyvinyl butyral resin, there are no particular limitations on the method thereof and a conventionally-known method can preferably be used. Typically, a method is preferably used in which a polyvinyl ester-based resin (polymer) is first formed by copolymerizing a vinyl ester-based monomer such as vinyl acetate by solution polymerization or the like, the polyvinyl ester-based resin is then saponified to obtain a PVA-based resin, and the resulting PVA-based resin is dissolved in water and reacted with butyl aldehyde at a low temperature to carry out butyralation and to precipitate the polyvinyl butyral resin, followed by raising the temperature of the system to terminate the butyralation reaction and reorganize the acetalated portions. The polyvinyl butyral resin is preferably suppressed to a low degree of polymerization. An example of a method for producing such a polyvinyl butyral resin uses a polyvinyl ester-based polymer obtained by radical polymerization of a vinyl ester-based monomer in the presence of an iodine compound such as iodoform. Furthermore, since the method used to produce the polyvinyl butyral resin per se does not characterize the present invention in any way, a further detailed explanation thereof is omitted.

A liquid medium that is preferable as a carbon nanotube dispersion is prepared by dissolving the above-mentioned polyvinyl butyral resin in an alcohol solvent as previously described. Furthermore, although the above-mentioned alcohol solvent may be a mixed alcohol in which two or more types of lower alcohols are mixed as previously described, a mixed solvent, in which an aromatic hydrocarbon (for example, toluene or xylene) and/or an organic solvent such as an ester or ketone (for example, ethyl acetate or ethyl methyl ketone) is mixed with the above-mentioned lower alcohol (typically, methanol or ethanol) at a prescribed ratio (for example, at a volume ratio of alcohol:aromatic hydrocarbon of about 4:6), can also preferably be used. Use of the mixed solvent is effective for adjusting the viscosity of a carbon nanotube dispersion or for further increasing the transparency of a coated film of the dispersion.

In addition, the above-mentioned liquid medium can contain various types of additives as auxiliary components, as necessary, in addition to the polyvinyl butyral resin. Examples of such additives include surfactants, antioxidants, viscosity adjusters, pH adjusters and preservatives.

Next, an explanation is provided of the mixing ratio of the carbon nanotubes and the polyvinyl acetal polymer to the alcohol solvent. 0.5 mg to 1000 mg (for example, 0.5 mg to 200 mg, typically 0.5 mg to 50 mg and particularly 1 mg to 30 mg) of carbon nanotubes are preferably dispersed in 100 mL of the alcohol solvent. In addition, when selectively using only single-walled carbon nanotubes, 0.5 mg to 200 mg (more preferably 0.5 mg to 100 mg and typically 1 mg to 30 mg) of the above-mentioned carbon nanotubes are preferably dispersed in 100 mL of the above-mentioned alcohol solvent. Moreover, when selectively using multi-walled carbon nanotubes, 0.5 mg to 1000 mg (more preferably 0.5 mg to 200 mg and typically 1 mg to 50 mg) of the carbon nanotubes are preferably dispersed in 100 mL of the alcohol solvent. In addition, in the case of preparing a carbon nanotube film to be described later that can preferably be used as an electrically-conductive film (for example, a transparent electrically-conductive film used as an electrode of a solar cell, liquid crystal display or plasma display) by, for example, a dip coating method, 60 mg or less, and for example, 1 mg to 40 mg (typically 1 mg to 20 mg) of carbon nanotubes are preferably dispersed in 100 mL of the alcohol solvent. On the other hand, in the case of preparing a carbon nanotube film able to be preferably used as an electrically-conductive film as described above by, for example, a dropping method, 10 mg or less, and for example, 1 mg to 10 mg (typically 1 mg to 5 mg) of carbon nanotubes are preferably dispersed in 100 mL of the alcohol solvent.

The polyvinyl acetal resin is preferably dissolved in the alcohol solvent at a weight ratio of 0.5 to 10 (preferably 1 to 3 and typically 1 to 2) with respect to the above-mentioned carbon nanotubes. When dissolving a larger amount of carbon nanotubes in the alcohol solvent, dispersibility is improved by making the weight ratio of the polyvinyl acetal resin to the carbon nanotubes greater than 1. In other words, by preparing a liquid medium by suitably adjusting the amount of polyvinyl acetal resin dissolved in the alcohol solvent with respect to the amount of carbon nanotubes desired to be dispersed, carbon nanotube dispersions can be obtained over a wide concentration range. For example, in the case of dispersing carbon nanotubes in a liquid medium, namely an alcohol solvent (for example, 100 mL of ethanol) in which a polyvinyl acetal resin is dissolved, although up to about 10 mg of carbon nanotubes are satisfactorily dispersed if the weight ratio of the polyvinyl acetal resin to the carbon nanotubes is 1:1, if a larger amount of carbon nanotubes is dispersed, the resulting dispersed state cannot be maintained for a long period of time (for example, 2 weeks or more). In the case of dispersing 20 mg or more of carbon nanotubes and maintaining the dispersed state thereof for 2 weeks or more, it is preferable to dissolve the polyvinyl acetal resin in the alcohol solvent up to a weight ratio of about 1.5 to 2 (namely, by dissolving 30 mg to 40 mg of the polyvinyl acetal resin to 20 mg of carbon nanotubes). In case the weight ratio of the polyvinyl acetal resin to the carbon nanotubes exceeds the upper limit of the above-mentioned range, although dispersibility of the carbon nanotubes is satisfactory, the viscosity of the dispersion becomes excessively high.

On the other hand, in case the weight ratio is less than 0.5, even if the carbon nanotubes are satisfactorily dispersed in the liquid medium temporarily, that satisfactory dispersibility cannot be maintained for a long period of time of, for example, 2 weeks or more, and the carbon nanotubes tend to aggregate in the liquid medium and settle. For example, in case the weight ratio of the polyvinyl acetal resin to carbon nanotubes in 100 mL of ethanol is 0.4 to 0.5, although a satisfactory dispersed state is exhibited immediately upon preparing the dispersion, the carbon nanotubes end up aggregating and settling on the following day or the day after. In case the weight ratio is 0.3 or less, dispersibility is not exhibited even at the time of dispersion preparation, and aggregates of the carbon nanotubes do not disperse even if stirred. In addition, in case the amount of carbon nanotubes to the amount of the alcohol solvent is excessively high or excessively low (namely, in case of deviation from the above-mentioned range), the efficiency or efficacy of the stirring treatment to be described later tends to decrease.

A carbon nanotube dispersion that contains carbon nanotubes and polyvinyl acetal resin at a preferable mixing ratio as described above is able to exhibit a satisfactory dispersed state. Here, a satisfactory dispersed state refers to a state in which carbon nanotube bundles (which may also be single carbon nanotubes) are uniformly dispersed in a liquid medium if allowed to stand undisturbed at room temperature, and a state in which aggregated carbon nanotubes do not settle, at least as can be visually determined, is maintained for 2 weeks.

In the method for producing a carbon nanotube dispersion as disclosed herein, after preparing the carbon nanotubes and liquid medium used as raw materials, the carbon nanotubes are placed in a container along with the liquid medium, followed by carrying out a dispersion treatment. The dispersion treatment includes at least a stirring treatment and an ultrasonic treatment. A container having a well-sealed structure is preferably used as the above-mentioned container (stirring container). Carrying out stirring treatment after sealing the container is also preferable since a pressurized state to be subsequently described is realized easily.

The above-mentioned stirring treatment refers to a high-speed stirring treatment, and is carried out by stirring the contents of the container (typically, the carbon nanotubes and liquid medium used as raw materials) by rotating a stirrer within the container at high speed (high rotating speed). The above-mentioned stirrer may be a member that is constituted so as to be able to rotate at a high rotating speed in the container, and there are no particular limitations on the shape thereof. In addition, there are also no particular limitations on the mechanism that rotates the stirrer, provided it is able to realize the desired rotating speed. For example, the above-mentioned high-speed stirring treatment can be carried out by using a stirring apparatus having a configuration in which a long, narrow plate-shaped or propeller-shaped stirrer (stirring blade) is attached to a stirring shaft connected to a motor. Here, the size of the stirrer and its location relative to the container are preferably set so that the stirrer rotates without contacting the inner walls of the container.

The rotating speed of the stirrer during high-speed stirring treatment can be, for example, about 10,000 rpm or more (and typically 10,000 rpm to 50,000 rpm), and is preferably about 10,000 rpm to 30,000 rpm. If the rotating speed of the stirrer is excessively low, stirring efficiency decreases or the effect of stirring (effect of reducing aggregation of carbon nanotubes) is diminished. On the other hand, if the rotating speed of the stirrer is excessively high, the carbon nanotubes may be susceptible to damage. An example of a commercially-available stirring apparatus suitable for carrying out this high-speed stirring is a product sold under the trade name "Millser" series by Iwatani Corp.

Although there are no particular limitations thereon, the time that the high-speed stirring treatment is carried out (stirring time) can be, for example, 5 seconds to 30 minutes. Normally, the stirring time is preferably about 10 seconds to 10 minutes, and more preferably 30 seconds to 5 minutes, from the viewpoint of improving treatment efficiency and suppressing damage to the carbon nanotubes attributable to the treatment.

The treatment temperature at this time is a temperature at which the liquid medium is maintained in a liquid state. For example, in case the alcohol solvent that comprises the liquid medium is ethanol, a treatment temperature of about 5° C. to 60° C. (and preferably 10° C. to 50° C.) can be employed. Heating the container contents to a temperature range slightly higher than room temperature makes it possible to improve treatment efficiency and realize effects such as reducing damage to the carbon nanotubes. In this case, high-speed stirring treatment is carried out by heating the contents to, for example, 30° C. to 60° C. (and preferably about 30° C. to 50° C.). In addition, the contents may also be heated for only a portion of the stirring time.

The above-mentioned stirring treatment can be preferably carried out under conditions such that the internal pressure of the stirring container is at atmospheric pressure (typically about $1 \times 10^5$ Pa) or is in a pressurized state at a pressure higher than atmospheric pressure. For example, the internal pressure of the container can be about atmospheric pressure to about $2 \times 10^5$ Pa (about 2 atmospheres), and preferably atmospheric pressure to about $1.5 \times 10^5$ Pa or atmospheric pressure to about $1.2 \times 10^5$ Pa. Efficiency and efficacy of the treatment can be improved by carrying out the stirring treatment with the container in a pressurized state. The inside of the container may also be in a pressurized state for only a portion of the stirring time. In addition, since evaporation of the solvent in the liquid medium is promoted by the stirring treatment, the inside of the container can also be put into a pressurized state by utilizing the vapor pressure of the above-mentioned solvent by carrying out the above-mentioned stirring treatment while the container is sealed. In addition, the internal pressure of the container can also be increased by raising the vapor pressure of the solvent that comprises the liquid medium by heating the container while in a sealed state (for example, by heating to about 30° C. to 60° C. and preferably about 30° C. to 50° C.).

In the method for producing a dispersion disclosed herein, ultrasonic treatment is further carried out on the product obtained by the stirring treatment described above. The contents of the container following stirring treatment may be subjected to ultrasonic treatment directly (and particularly, without changing the composition), or the contents may be subjected to ultrasonic treatment after adding an optional ingredient thereto (such as a solvent that is the same as or different from the solvent that comprises the liquid medium or various types of additives). The container, which was used following the stirring treatment, may also continue to be used for the ultrasonic treatment, or the ultrasonic treatment may be carried out after transferring the contents of the container following the stirring treatment to a different container.

Ultrasonic waves having a frequency of, for example, about 20 kHz to 40 kHz can be employed as the ultrasonic waves used in the ultrasonic treatment. Ultrasonic treatment is carried out at a power output of, for example, about 80 W to 200 W using an ultrasound apparatus capable of generating ultrasonic vibrations at that frequency. If the power output is excessively low, the treatment efficiency tends to decrease, while if the power output is excessively high, there is increased susceptibility to the occurrence of damage to the carbon nanotubes. There are no particular limitations on the type of ultrasound apparatus used (such as the method in which ultrasonic waves are generated or the configuration of the apparatus), and a suitable apparatus can be selected corresponding to the objectives, the situation, etc.

The time that the ultrasonic treatment is carried out can be suitably set so that a desired dispersed state is realized, taking into consideration the amount of the previously carried out stirring treatment, the ultrasonic treatment conditions (for example, frequency) or the like. For example, the treatment time can be preferably set to about 1 minute to 2 hours, and normally is preferably set to about 3 minutes to 1 hour (and preferably about 5 minutes to 30 minutes). If the ultrasonic treatment time is excessively short, the effect of improving the dispersibility may be somewhat diminished, while if the treatment time is excessively long, there is increased susceptibility of the occurrence of damage to the carbon nanotubes.

The degree to which the stirring treatment is carried out in the above-mentioned dispersion treatment can be suitably set in consideration of such factors as the amount of the container contents (typically, the liquid medium and carbon nanotubes), the concentration of the carbon nanotubes in the contents, and the target dispersed state. For example, the stirring treatment is carried out so that a dispersion is formed in a state in which carbon nanotubes or carbon nanotube bundles, which have unraveled to a diameter of less than 1 μm (and typically 0.1 μm or more to less than 1 μm) while maintaining a length of 1 μm or more, are dispersed in a liquid medium. The conditions under which the stirring treatment is carried out (such as stirring time, rotating speed, container internal pressure or temperature) are set so that such a dispersion is obtained. For example, an example of preferable stirring conditions is rotating for 30 seconds to 5 minutes (for example, for about 1 minute) at a rotating speed of 10,000 rpm or more (for example, about 20,000 rpm). If the stirring treatment is carried out under these conditions, a dispersion is obtained in which carbon nanotube bundles, in which carbon nanotubes are in the form of bundles, are dispersed to, for example, 2 μm to 20 μm and a diameter of 0.1 μm to 0.5 μm.

In addition, the degree to which ultrasonic treatment is carried out on the product of the above-mentioned stirring treatment is such that a dispersion is formed in the state in which carbon nanotube bundles (single carbon nanotubes are also allowed), dissolved to, for example, a diameter of less than 0.1 μm (and typically to a diameter equal to or greater than the diameter of single carbon nanotubes contained in carbon nanotube aggregates used for the raw material but less than 0.1 μm) while maintaining a length of 1 μm or more, are dispersed in a liquid medium. The conditions under which the ultrasonic treatment is carried out (such as treatment time, frequency or power output) are set so that such a dispersion is obtained. For example, in the case of using an immersion-type ultrasound apparatus, a preferred example of ultrasonic treatment conditions is applying ultrasonic vibrations of 20 kHz to 30 kHz (for example, 20 kHz) and 100 W to 150 W (for example, 120 W) for 5 to 30 minutes (for example, 15 minutes) to the above-mentioned dispersion (namely, the product of stirring treatment). As a result of this dispersion treatment, a dispersion is obtained in which carbon nanotube bundles, having a length of 1 μm or more and a diameter of less than 0.1 μm, are uniformly dispersed in a liquid medium.

Furthermore, a carbon nanotube dispersion can be produced in which carbon nanotubes (typically, carbon nanotube bundles having a length of 1 μm or more and diameter of less than 1 μm) are dispersed in a dispersion medium that differs from the above-mentioned liquid medium by adding and mixing other ingredients to the dispersion. For example, a carbon nanotube-containing paste can be prepared by adding various types of polymeric materials or precursors thereof (for example, a prepolymer of a thermosetting resin). Moreover, a carbon nanotube dispersion can be obtained in which carbon nanotubes are dispersed in a thermosetting resin by removing a volatile component (organic solvent in the liquid medium) contained in the paste, followed by curing the above-mentioned prepolymer.

A carbon nanotube film (film-like carbon nanotube dispersion) can be preferably formed by applying (coating) a carbon nanotube dispersion produced according to the manufacturing method described above (including a carbon nanotube-containing paste containing a polymeric material or precursor thereof in the dispersion) onto a substrate. There are no particular limitations on the method used to coat the carbon nanotube dispersion onto the substrate, and conventionally known methods can be preferably used, such as dip coating, spin coating, casting, bar coating, dropping, spraying or screen printing.

In addition, there are also no particular limitations on the type of substrate to which the film is applied, and an inorganic material such as glass, Si single crystal or porous carbon, or a polymeric material such as PET film, can preferably be utilized. In addition, there are no particular limitations on the shape of the substrate, and the dispersion can be coated onto the surface of a plate-like, cylindrical or other form of substrate in accordance with the objective. For example, a preferred example of forming the above-mentioned carbon nanotube film on both sides of a PET film using a dip coating method is described below. Namely, a carbon nanotube dispersion is prepared in which 40 mg of polyvinyl butyral resin and 50 mg of carbon nanotubes are mixed into 500 mL of 2-propanol, and the above-mentioned film is immersed in the dispersion. After immersing, the film is pulled out of the dispersion at the rate of 4 mm/sec. In this manner, a uniform, ultra-thin film of the level of a monomolecular film can be formed on both sides of the above-mentioned film.

In addition, a carbon nanotube film may also be formed by further coating the above-mentioned dispersion onto the surface of a substrate on which a thin film layer such as a metal film or insulating film, for example, has been formed. Alternatively, a carbon nanotube film can be formed by coating the above-mentioned dispersion onto the surface of a substrate, layering a different substrate thereon, thus forming a carbon nanotube layer between the first substrate and the layered substrate. Thus, a film element having such characteristics can be produced according to the present teachings.

As a result of carrying out a treatment in which a carbon nanotube film is formed on a substrate using the carbon nanotube dispersion disclosed herein, since the above-mentioned dispersion has a low viscosity and strongly adheres to the substrate, the carbon nanotube film is uniformly formed on the substrate (namely, in a uniform film thickness), and a film element can be provided that is provided with a carbon nanotube film having superior fixability. The use of a dispersion in which carbon nanotubes are dispersed in a transparent liquid medium (for example, a dispersion in which about 1 mg to 40 mg are dispersed in 100 mL of an alcohol solvent) enables the formation of a transparent carbon nanotube film by dip coating, for example, in which a suitable substrate is immersed in the dispersion. Moreover, the film functions as an electrically-conductive film or semiconductor film due to the electrical conductivity (metallic property) or semiconductivity of the carbon nanotubes. Namely, the carbon nanotube film is able to impart the function of electrical conductivity or semiconductivity to the above-mentioned substrate. Thus, together with being able to be used as an anti-static (charge-preventing) film or a protective film, a film element provided with that film can be used as a semiconductor device material, a fuel cell electrode material or a gas storage material.

Although the following provides an explanation of specific examples relating to the present invention, the present invention is not intended to be limited to that indicated in the examples.

EXPERIMENTAL EXAMPLE 1

Figure 1:
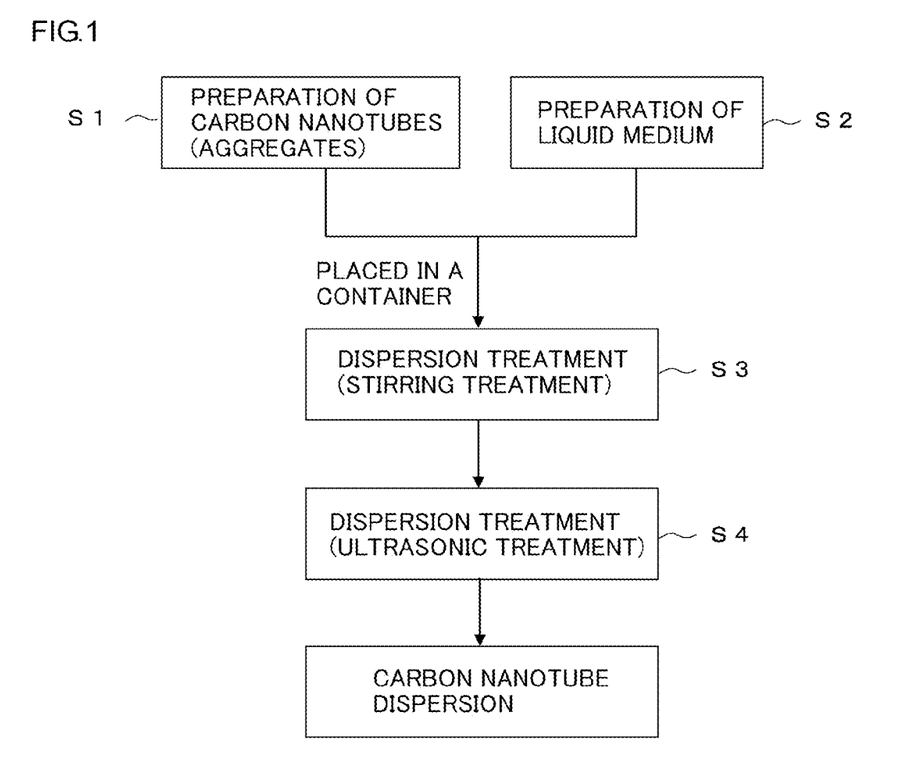
FIG. 1 is a flow chart showing an overview of a representative manufacturing method of a carbon nanotube dispersion.

A carbon nanotube dispersion was produced according to the procedure shown in FIG. 1. First, carbon nanotube aggregates were prepared by various methods (such as arc discharge) for use as a raw material (Step S1). In the present experimental example, the carbon nanotube aggregates were prepared in the manner described below.

Namely, a pair of stick-shaped electrodes (cathode and anode) were prepared that were composed of graphite-containing iron (0.5 mol % to 5 mol %), and the electrodes were arranged in mutual opposition in a reaction vessel at a spacing of about 0.5 mm to 5 mm. The inside of the reaction vessel was adjusted to an atmosphere at a hydrogen gas ($H_2$) partial pressure of $1.3 \times 10^4$ Pa and an inert gas (in this case, argon (Ar)) partial pressure of about $1.3 \times 10^4$ Pa. A voltage of about 20 V to 40 V was applied between the pair of electrodes from a direct current power supply, a current of about 30 A to 70 A was supplied from the power supply, and an arc discharge was generated between the two electrodes. Carbon was evaporated from the cathode by the arc discharge to obtain a spider web-like product containing single-walled carbon nanotubes. The ratio of single-walled carbon nanotubes contained in the product was 70 mol % or more. Heat treatment was carried out on this product for about 25 to 35 minutes at a temperature of 670 K to 720 K, and together with removing carbon impurities in the product (such as amorphous carbon) as a gas (such as CO or $CO_2$), the catalyst (in this case, iron granules) was oxidized. Moreover, by treating the product with hydrochloric acid or the like following the above-mentioned heat treatment, the oxidized catalyst was eluted and removed. Carbon nanotube aggregates were obtained in this manner.

Next, a liquid medium was prepared (Step S2). In the present experimental example, the liquid medium was prepared in the manner described below.

Namely, commercially-available anhydrous ethanol (purity: 99.9%) was used for the alcohol solvent. "BL-10" (trade name), which is a member of the "S-LEC B" series of polyvinyl butyral resin products manufactured by Sekisui Chemical Co., Ltd. (calculated molecular weight: approx. $1.5 \times 10^4$, hydroxyl groups: approx. 28 mol %, degree of butyralation: 71±3 mol %, solution viscosity: 9 to 15 mPa·s) was used for the polyvinyl butyral resin. 1.0 mg of the above-mentioned polyvinyl butyral resin was dissolved in 100 mL of the above-mentioned ethanol to obtain a liquid medium.

Next, the carbon nanotube aggregates and liquid medium were placed together in a container and a stirring treatment as a part of a dispersion treatment was carried out (Step S3). In the present experimental example, the stirring treatment was carried out in the manner described below.

A "Millser 80DG" (trade name), manufactured by Iwatani Corp., was used as the stirring apparatus for the stirring treatment of the dispersion treatment. 100 mL of the liquid medium containing 1.0 mg of the polyvinyl butyral resin along with 1 mg of the carbon nanotube aggregates were placed in the container (capacity: 200 mL) of this stirring apparatus at room temperature (approx. 23° C.). The cover of the container was closed to seal the inside of the container at atmospheric pressure, the container was placed in the stirring apparatus, and the contents of the container were stirred at high speed by operating for 1 minute at 20,000 rpm. The pressure inside the container at the completion of the stirring had increased to 1.1 atmosphere (approx. $1.1 \times 10^5$ Pa), and the temperature of the contents had risen to about 45° C.

Next, ultrasonic treatment was carried out following the above-mentioned stirring treatment (Step S4). In the present experimental example, the ultrasonic treatment was carried out in the manner described below.

Figure 2:
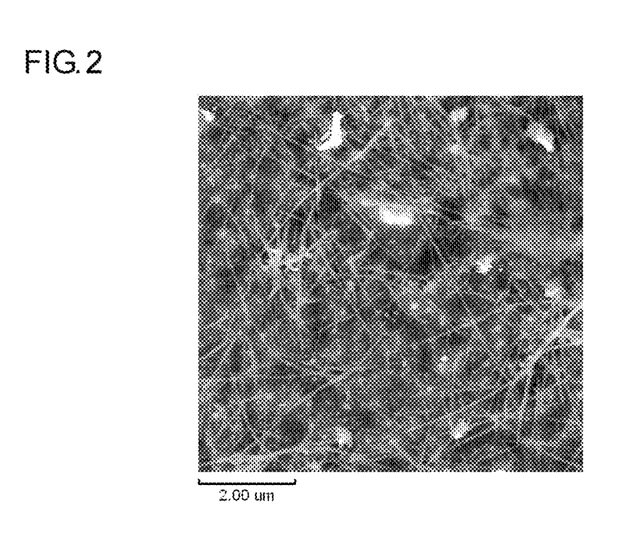
FIG. 2 is an SPM micrograph of an ethanol dispersion of carbon nanotubes obtained in Experimental Example 1.

Following the above-mentioned stirring treatment, the cover of the above-mentioned container was opened and the contents were transferred to a different container. The container was immersed in the horn of an immersion-type ultrasound apparatus (trade name: "Sonifier S-450", Branson Ultrasonics Corp.), and the apparatus was operated for 15 minutes at a frequency of 20 kHz and a power output of 120 W. In this manner, a dispersion was obtained in which carbon nanotubes were dispersed in a liquid medium (in this case, ethanol). A scanning probe micrograph (SPM) of the resulting dispersion is shown in FIG. 2. As is clear from this micrograph, the majority of the dispersed carbon nanotubes maintain a length of 1 µm or more (namely, are not excessively fragmented), and aggregates having a diameter in excess of 0.1 µm were not observed. In this manner, the carbon nanotube dispersion produced according to the present experimental example was confirmed to consist of an extremely highly dispersed dispersion of carbon nanotubes having properties that are suitable for exhibiting the inherent properties of carbon nanotubes.

Figure 3:
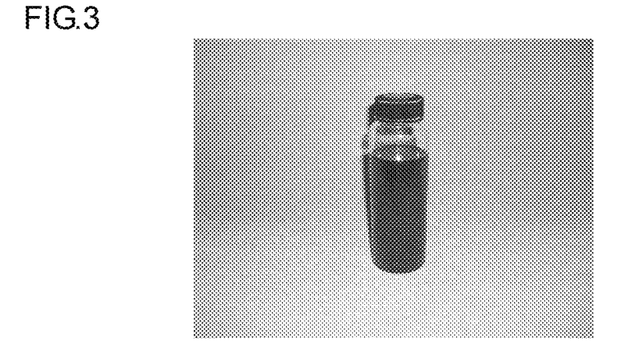
FIG. 3 is an optical photograph of an ethanol dispersion of carbon nanotubes obtained in Experimental Example 1.

In addition, the dispersion obtained in the manner described above was allowed to stand undisturbed. An optical photograph of the above-mentioned dispersion after being allowed to stand undisturbed for 2 weeks is shown in FIG. 3. As is clear from this micrograph, there was no settling of carbon nanotube aggregates and a satisfactory dispersed state was confirmed to be maintained even after being allowed to stand undisturbed for 2 weeks.

EXPERIMENTAL EXAMPLE 2

Figure 4:
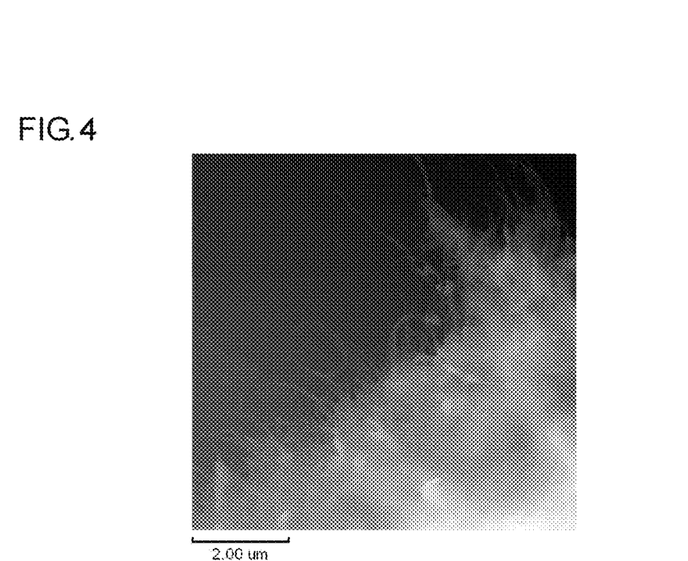
FIG. 4 is an SPM micrograph of an ethanol dispersion of carbon nanotubes not containing a polyvinyl butyral resin obtained in Experimental Example 2.
Figure 5:
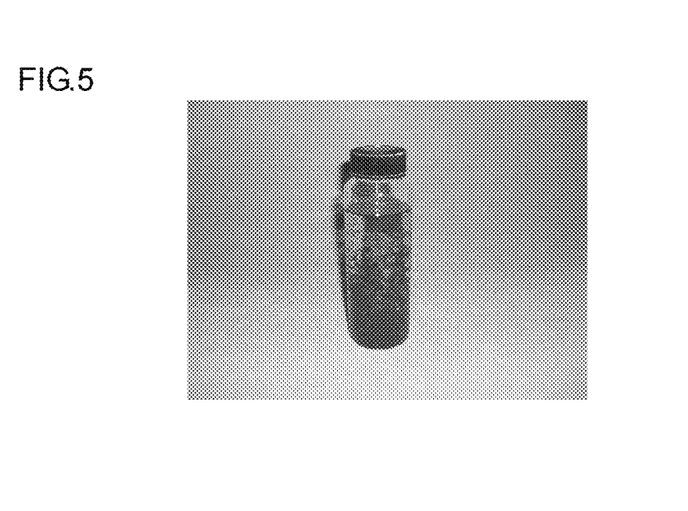
FIG. 5 is an optical photograph of an ethanol dispersion of carbon nanotubes not containing a polyvinyl butyral resin obtained in Experimental Example 2.

Next, a liquid medium not containing polyvinyl butyral resin was prepared (namely, a liquid medium containing only ethanol). A carbon nanotube dispersion was produced in the same manner as Experimental Example 1 with the exception of not containing polyvinyl butyral resin as described above. As a result, although carbon nanotube aggregates were initially dispersed in the resulting dispersion, they soon settled and a dispersed state was unable to be maintained. An SPM micrograph of this dispersion is shown in FIG. 4, while an optical photograph thereof is shown in FIG. 5.

EXPERIMENTAL EXAMPLE 3

Figure 6:
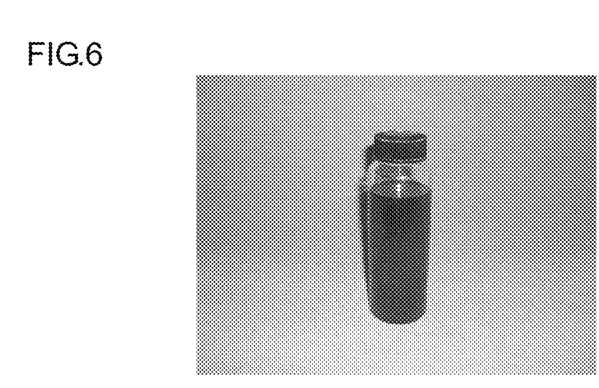
FIG. 6 is an optical photograph of a methanol dispersion of carbon nanotubes obtained in Experimental Example 3.

Next, the ethanol used for the alcohol solvent in the liquid medium was changed to commercially-available absolute methanol (purity: 99.9%). A carbon nanotube dispersion was produced in the same manner as Experimental Example 1 with the exception of using the above-mentioned methanol instead of ethanol. The resulting dispersion was then allowed to stand undisturbed. An optical photograph of the dispersion after being allowed to stand undisturbed for 2 weeks is shown in FIG. 6. As is clear from this micrograph, there was no settling of carbon nanotube aggregates and a satisfactory dispersed state was confirmed to be maintained even after being allowed to stand undisturbed for 2 weeks.

EXPERIMENTAL EXAMPLE 4

Figure 7:
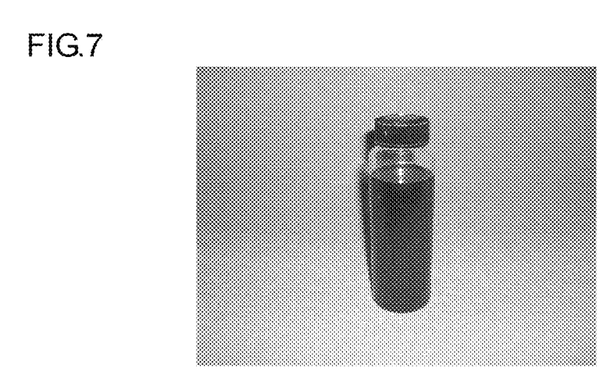
FIG. 7 is an optical photograph of a 2-propanol dispersion of carbon nanotubes obtained in Experimental Example 4.

Next, the ethanol used for the alcohol solvent in the liquid medium was changed to commercially-available 2-propanol (purity: 99.9%). A carbon nanotube dispersion was produced in the same manner as Experimental Example 1 with the exception of using the above-mentioned 2-propanol instead of ethanol. The resulting dispersion was then allowed to stand undisturbed. An optical photograph of the dispersion after being allowed to stand undisturbed for 2 weeks is shown in FIG. 7. As is clear from this micrograph, there was no settling of carbon nanotube aggregates and a satisfactory dispersed state was confirmed to be maintained even after being allowed to stand undisturbed for 2 weeks.

EXPERIMENTAL EXAMPLE 5

Next, the above-mentioned 2-propanol (purity: 99.9%) was used for the alcohol solvent in the liquid medium. In addition, carbon nanotube aggregates obtained in the same manner as Experimental Example 1 and the same polyvinyl butyral resin used in Experimental Example 1 were mixed with 100 mL of the 2-propanol at one of three mixing ratios [mg] indicated in (1) to (3) below:
(1) carbon nanotubes:polyvinyl butyral resin=30:30,
(2) carbon nanotubes:polyvinyl butyral resin=40:40, and
(3) carbon nanotubes:polyvinyl butyral resin=40:80.

Dispersion treatment was carried out on each of the samples mixed at the mixing ratios of (1) to (3) in the same manner as Experimental Example 1, followed by confirmation of the dispersibility of the resulting dispersions.

As a result, the carbon nanotubes were uniformly dispersed in the dispersions using the mixing ratios (1) and (3). In addition, a satisfactory dispersed state was confirmed to be maintained even after being allowed to stand undisturbed for 2 weeks. On the other hand, although the carbon nanotubes were uniformly dispersed immediately after dispersion treatment in the dispersion using the mixing ratio of (2), the carbon nanotubes ended up aggregating and settling within 1 day (24 hours), and a dispersed state was unable to be maintained.

The invention claimed is:

1. A carbon nanotube dispersion comprising carbon nanotubes dispersed in a liquid medium, wherein:
the liquid medium includes an alcohol solvent and a polyvinyl butyral resin, 0.5 mg to 200 mg of the carbon nanotubes are dispersed per 100 mL of the alcohol solvent,
a weight ratio of the polyvinyl butyral resin to the carbon nanotubes is between 0.5 and 2 and
the polyvinyl butyral resin exhibits a solution viscosity of 5 mPa·s to 30 mPa·s at 20° C. when dissolved at a concentration of 10% by weight in a mixed solvent consisting of ethanol and toluene at a volume ration of 1:1.

2. The dispersion according to claim 1, wherein the alcohol solvent is a lower alcohol having 1 to 4 carbon atoms.

3. The dispersion according to claim 2, wherein the polyvinyl butyral resin has a degree of polymerization of 150 to 600 and a degree of butyralization of 65 mol% to 80 mol% and wherein the carbon nanotubes have a length of at least 1 µm and a diameter of less than 0.1 µm.

4. The dispersion according to claim 3, wherein the dispersion has the property that the carbon nanotubes remain in a uniformly dispersed state for at least 2 weeks when allowed to stand undisturbed at room temperature.

5. A carbon nanotube film obtained by applying the carbon nanotube dispersion according to claim 4 onto a substrate.

6. The dispersion according to claim 1, wherein the carbon nanotubes have a length of at least about 1 µm and a diameter of less than about 0.1 µm.

7. The dispersion according to claim 1, wherein:
the polyvinyl butyral resin also satisfies at least one of the following conditions (iii)-(v):
(iii) it has 20 mol% to 35 mol% of hydroxyl groups;
(iv) it has a degree of butyralization of 65 mol% to 80 mol%;
(v) it has 5 mol% or less of acetyl groups.

8. The dispersion according to claim 7, wherein the polyvinyl butyral resin satisfies all three conditions (iii)-(v).

9. The dispersion according to claim 1, wherein the polyvinyl butyral resin has a degree of butyralization of 65 mol% to 80 mol%.

10. The dispersion according to claim 1, wherein:
the polyvinyl butyral resin exhibits a solution viscosity of 9 mPa·s to 15 mPa·s at 20° C. when dissolved at a concentration of 10% by weight in a mixed solvent consisting of ethanol and toluene at a volume ratio of 1:1; and
the polyvinyl butyral resin also satisfies the following conditions (vi)-(viii):
(vi) it has 20 mol% to 35 mol% of hydroxyl groups;
(vii) it has a degree of butyralization of 71±3 mol%; and
(viii) it has 2 mol% to 5 mol% of acetyl groups.

11. The dispersion according to claim 10, wherein the weight-to-volume ratio of the carbon nanotubes to the alcohol is 1-10 milligrams of carbon nanotubes per 100 milliliters of alcohol.

12. The dispersion according to claim 11, wherein the liquid medium consists of ethanol and polyvinyl butyral resin.

13. The dispersion according to claim 1, wherein the dispersion has the property that the carbon nanotubes maintain a dispersed state for at least 2 weeks when allowed to stand undisturbed at room temperature.

14. A carbon nanotube film obtained by applying the carbon nanotube dispersion according to claim 1 onto a substrate.

15. A method for producing a dispersion comprising carbon nanotubes dispersed in a liquid medium, comprising:
preparing a liquid medium containing an alcohol solvent and a polyvinyl butyral resin,
placing carbon nanotubes in a container along with the liquid medium and
carrying out a dispersion treatment on the contents of the container,
wherein 0.5 mg to 200 mg of the carbon nanotubes are dispersed per 100 mL of the alcohol solvent, a weight ratio of the polyvinyl butyral resin to the carbon nanotubes is between 0.5 and 2 and the dispersion treatment includes at least stirring and application of ultrasound; and
the polyvinyl butyral resin exhibits a solution viscosity of 5 mPa·s to 30 mPa·s at 20° C. when dissolved at a concentration of 10% by weight in a mixed solvent consisting of ethanol and toluene at a volume ratio of 1:1.

16. The method according to claim 15, wherein the dispersion treatment is carried out so that a dispersion is formed that comprises carbon nanotube bundles having a length of at least 1 μm and a diameter of less than 0.1 μm dispersed in the liquid medium.

17. A method according to claim 16, wherein the alcohol solvent at least substantially comprises an alcohol having 1 to 4 carbon atoms, the polyvinyl butyral resin has a degree of polymerization of 150 to 600 and a degree of butyralization of 65 mol% to 80 mol%, and the ultrasound is applied at a frequency of between about 20 kHz to 40 kHz and a power output of between about 80 W to 200 W.

18. A method according to claim 17, wherein the alcohol is selected from ethanol, methanol and 2-proponal.

19. A carbon nanotube film obtained by applying the dispersion produced according to the method described in claim 15 onto a substrate.

20. A liquid dispersion comprising carbon nanotubes dispersed in a liquid medium, wherein the liquid medium comprises at least one alcohol and at least one polyvinyl butyral resin, a weight-to-volume ratio of the carbon nanotubes to the alcohol is 0.5-200 milligrams of carbon nanotubes per 100 milliliters of alcohol and a weight ratio of the polyvinyl butyral resin to the carbon nanotubes is between 0.5 and 2 and
the polyvinyl butyral resin exhibits a solution viscosity of 5 mPa·s to 30 mPa·s at 20° C. when dissolved at a concentration of 10% by weight in a mixed solvent consisting of ethanol and toluene at a volume ratio of 1:1.

* * * * *